(12) United States Patent
Jia

(10) Patent No.: US 12,299,414 B2
(45) Date of Patent: May 13, 2025

(54) DATA PROCESSING METHOD AND APPARATUS, ELECTRONIC DEVICE, AND READABLE STORAGE MEDIUM

(71) Applicant: Suzhou MetaBrain Intelligent Technology Co., Ltd., Suzhou (CN)

(72) Inventor: Zhaorong Jia, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/725,085

(22) PCT Filed: Sep. 19, 2022

(86) PCT No.: PCT/CN2022/119682
§ 371 (c)(1),
(2) Date: Jun. 27, 2024

(87) PCT Pub. No.: WO2023/197526
PCT Pub. Date: Oct. 19, 2023

(65) Prior Publication Data
US 2024/0419405 A1 Dec. 19, 2024

(30) Foreign Application Priority Data
Apr. 13, 2022 (CN) .......................... 202210381420.3

(51) Int. Cl.
*G06F 7/78* (2006.01)
(52) U.S. Cl.
CPC ..................................... *G06F 7/78* (2013.01)
(58) Field of Classification Search
CPC .... G06F 17/15–16; G06F 3/00; G06F 3/0647; G06F 3/0656; G06F 3/0661;
(Continued)

(56) References Cited

U.S. PATENT DOCUMENTS

2010/0106944 A1* 4/2010 Symes .................... G06F 9/382
712/E9.028
2019/0026078 A1* 1/2019 Bannon ................. G06F 7/5443
(Continued)

FOREIGN PATENT DOCUMENTS

CN 107209871 A 9/2017
CN 108629411 A 10/2018
(Continued)

OTHER PUBLICATIONS

Shuo, Zhang "Research on Parallel Computing Architecture of Multiple CNN Models on FPGA" <<China Doctor/Master Dissertations Full-text Database(Doctor)-Information Technology Album>> vol. 1 Jun. 2021, Jun. 15, 2021, Beijing University of Technology, including English Abstract, 170 pages.
(Continued)

*Primary Examiner* — Andrew Caldwell
*Assistant Examiner* — Huy Duong
(74) *Attorney, Agent, or Firm* — Crowell & Moring LLP

(57) ABSTRACT

The present application discloses a data processing method and apparatus, an electronic device, and a computer-readable storage medium. The method is applied to a convolution adaptor, and the convolution adaptor is arranged between external storage and an internal cache of a computing unit. The method includes: acquiring register data, where the register data is determined according to data types of target data and/or convolution types of convolution processing applied to the target data, and is used for describing reading modes of the target data; and reading the target data from the external storage according to the register data, and storing the target data in the internal cache according to a data read sequence.

20 Claims, 16 Drawing Sheets

(58) Field of Classification Search
CPC ....... G06F 3/0601–0605; G06F 3/0638; G06F 7/76; G06F 7/78; Y02D 10/00
See application file for complete search history.

(56) References Cited

U.S. PATENT DOCUMENTS

| | | | |
|---|---|---|---|
| 2020/0089506 A1* | 3/2020 | Power | G06V 10/95 |
| 2020/0265106 A1 | 8/2020 | Hargil et al. | |
| 2021/0173787 A1* | 6/2021 | Nagy | G06F 9/5027 |
| 2021/0224125 A1* | 7/2021 | Liu | G06N 3/063 |
| 2021/0241079 A1* | 8/2021 | Mills | G06F 7/544 |
| 2021/0390379 A1* | 12/2021 | Sun | G06F 9/4843 |
| 2023/0229588 A1* | 7/2023 | Aggarwal | G06F 12/02 |
| | | | 711/200 |

FOREIGN PATENT DOCUMENTS

| | | |
|---|---|---|
| CN | 109740746 A | 5/2019 |
| CN | 110046704 A | 7/2019 |
| CN | 110197233 A | 9/2019 |
| CN | 111008040 A | 4/2020 |
| CN | 111258646 A | 6/2020 |
| CN | 111465924 A | 7/2020 |
| CN | 114254744 A | 3/2022 |
| CN | 114461978 A | 5/2022 |

OTHER PUBLICATIONS

International Search Report and Written Opinion of International Searching Authority of corresponding PCT application (PCT/CN202/119682) Dec. 16, 2022 including English translation (12 pages).
Search report of corresponding CN priority application (CN202210381420.3) May 12, 2022 (1 page).
First Office Action of corresponding CN priority application (CN202210381420.3) May 18, 2022 including English translation (10 pages).
Supplementary search report of corresponding CN priority application (CN202210381420.3) Jun. 7, 2022 (2 pages).
Notification to Grant Patent Right for Invention of corresponding CN priority application (CN202210381420.3) Jun. 7, 2022 including English translation (3 pagess).
Zhaodong Chen et al, fuseGNN:Accelerating Graph Convolutional Neural Network Training on GPGPU, 2020, IEEE/ACM International Conference on Aided Computer Design(ICCAD), Nov. 25, 2020, Full text (9 pages).

* cited by examiner

Decomposing filter: The upper left corner is used as the coordinate origin

| start_y | 0 | | | | | | | 1 | | | | | | | |
|---|---|---|---|---|---|---|---|---|---|---|---|---|---|---|---|
| start_x | 0 | | | 1 | | | | 0 | | | | 1 | | | |
| split_r | 0 | | 1 | | 0 | | 1 | | 0 | | 1 | | 0 | | 1 | |
| split_s | 0 | 1 | 0 | 1 | 0 | 1 | 0 | 1 | 0 | 1 | 0 | 1 | 0 | 1 | 0 | 1 |
| x-coordinate | 0 | 2 | 0 | 2 | 1 | 3 | 1 | 3 | 0 | 2 | 0 | 2 | 1 | 3 | 1 | 3 |
| y-coordinate | 0 | 0 | 2 | 2 | 0 | 0 | 2 | 2 | 1 | 1 | 3 | 3 | 1 | 1 | 3 | 3 |

CNN adaptor descriptor

| 31 | | | 0 |
|---|---|---|---|
| NXTDESCPTR ||||
| SRC ADDR ||||
| DEST ADDR ||||
| CTRL REG ||||
| CONFIG REG ||||
| STATUS REG ||||
| SRC_X_STRIDE || DST_X_STRIDE ||
| SRC_Y_STRIDE || DST_Y_STRIDE ||
| SRC_Z_STRIDE || DST_Z_STRIDE ||
| PAD_0_VEC_SIZE | FRAME_SIZE | VECTOR_SIZE | PAD_1_VEC_SIZE |
| VEC7_REUSE | VEC6_REUSE | VEC5_REUSE | VEC4_REUSE |
| VEC3_REUSE | VEC2_REUSE | VEC1_REUSE | VEC0_REUSE |

FIG. 15

DATA PROCESSING METHOD AND APPARATUS, ELECTRONIC DEVICE, AND READABLE STORAGE MEDIUM

CROSS-REFERENCE TO RELATED APPLICATION

This application is the national phase application of International Application No. PCT/CN2022/119682, filed Sep. 19, 2022, which claims priority to Chinese Patent Application No. 202210381420.3, filed on Apr. 13, 2022 in China National Intellectual Property Administration and entitled "Data Processing Method and Apparatus, Electronic Device, and Readable Storage Medium". The contents of International Application No. PCT/CN2022/119682 and Chinese Patent Application No. 202210381420.3 are incorporated herein by reference in their entirety.

FIELD

The present application relates to a data processing method, a data processing apparatus, an electronic device, and a computer-readable storage medium.

BACKGROUND

The basic operations of convolutional neural networks (CNNs) are multiply-accumulate (MAC) operations, with much calculation. The correlation of the MAC operations in the same convolution layer is small, making it easy to perform parallel expansion, for example, stacking a plurality of arithmetic and logic units (ALUs) in an artificial intelligence (AI) chip. The operations mainly involve MAC, realizing a parallel architecture of single instruction multiple data (SIMD) or single instruction multiple threads (SIMT), or a spatial architecture of data stream processing. The AI chip should be able to adapt to various convolutional neural networks, including one-dimensional (1D)/two-dimensional (2D)/three-dimensional (3D) convolution, dilated convolution, deconvolution, transposed convolution, depth-wise separable convolution, group convolution, shuffled convolution, flattened convolution, and deformable convolution. The inventors have realized that although the basic operations of these convolutions are the same, different data transformation processing is required before convolution. The data transformation processing makes the operation efficiency of the AI chip lower.

SUMMARY

According to various embodiments disclosed herein, a data processing method, a data processing apparatus, an electronic device, and a computer-readable storage medium are provided.

A data processing method is applied to a convolution adaptor, the convolution adaptor being arranged between external storage and an internal cache of a computing unit, and the method includes:

acquiring register data, where the register data is determined according to data types of target data and/or convolution types of convolution processing applied to the target data, and is used for describing reading modes of the target data; and reading the target data from the external storage according to the register data, and storing the target data in the internal cache according to a data read sequence.

A data processing apparatus is applied to a convolution adaptor, the convolution adaptor being arranged between external storage and an internal cache of a computing unit, and the apparatus includes:

an acquisition module, configured to acquire register data, where the register data is determined according to data types of target data and/or convolution types of convolution processing applied to the target data, and is used for describing reading modes of the target data; and a data processing module, configured to read the target data from the external storage according to the register data, and store the target data in the internal cache according to a data read sequence.

An electronic device includes a memory and one or more processors, the memory storing therein computer readable instructions which, when executed by the one or more processors, cause the one or more processors to perform steps of the data processing method according to any one of the above.

One or more non-volatile storage media storing therein computer readable instructions are provided, the computer-readable instructions, when executed by one or more processors, causing the one or more processors to perform steps of the data processing method according to any one of the above.

The details of one or more embodiments of the present application are outlined in the drawings and the description below. Other features and advantages of the present application will be apparent from the specification, drawings, and claims.

BRIEF DESCRIPTION OF THE DRAWINGS

To explain the embodiments of the present application or the technical solutions in the related art more clearly, a brief introduction will be made to the drawings used in the embodiments or the description of the prior art. It is obvious that the drawings in the description below are only some embodiments of the present application, and those ordinarily skilled in the art can obtain other drawings according to these drawings without creative work.

FIG. 15 is a structural diagram of register data provided by one or more embodiments of the present application;

DETAILED DESCRIPTION

To make the object, technical solution, and advantages of the embodiments of the present application clearer, the technical solution in the embodiment of the present application is described clearly and completely in combination with the drawings in the embodiments of the present application. The described embodiments are a part of the embodiments of the present application, but not the whole embodiments. All other embodiments obtained by those ordinarily skilled in the art based on the embodiments in the present application without creative work shall fall within the scope of protection of the present application.

Deep learning networks include CNN, recurrent neural network (RNN), and transformer. CNN is mainly used in the field of video/image analysis; RNN is mainly used for processing time series data such as speech; and transformer is mainly used in the field of natural language understanding (NLU). At present, the practical application scenarios of deep learning network algorithms mainly focus on video/image processing, and the architecture of CNN is also the most mature and stable. The architecture of CNN is mainly introduced below. CNN convolves the learned features with the input data and uses a 2D convolution layer, making the architecture very suitable for processing 2D data (for example, images). CNN eliminates the need for manual feature extraction and extracts features directly from the image. This automatic feature extraction function makes the deep learning model highly accurate for computer vision tasks such as object classification.

CNN uses tens or hundreds of hidden layers to detect different features of the image. Each hidden layer increases the complexity of the learned image features. For example, the first hidden layer might learn how to detect edges, and the last hidden layer might learn how to detect more complex shapes that are particularly suited to the shape of the object we are to identify.

The basic operations of CNNs are MAC operations, with much calculation. The correlation of the MAC operations in the same convolution layer is small, making it easy to perform parallel expansion, for example, stacking a plurality of ALUs in an AI chip. The operations mainly involve MAC, realizing a parallel architecture of SIMD or SIMT, or a spatial architecture of data stream processing. In some architectures, a vector operation unit and a MAC matrix are built in to realize data parallel operation. These architectures might be summarized as follows: an architecture composed of on-chip storage (namely, internal cache) global buffer, and an on-chip arithmetic unit processing element (PE). The entire convolution process might be summarized as reading data from external storage, for example, dynamic random-access memory (DRAM), caching and computing on the chip, and then writing the results back to DRAM.

Figure 1:
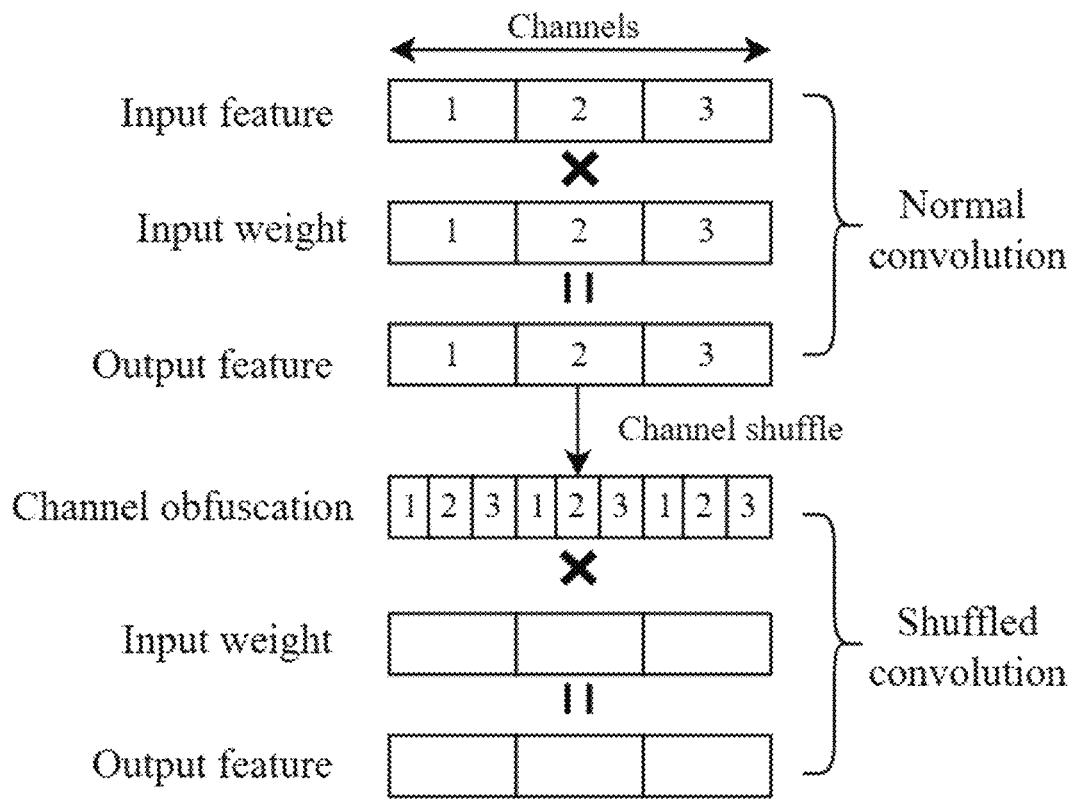
FIG. 1 is a diagram of a data transformation process provided by one or more embodiments of the present application.

However, the current AI chip faces the following problems:

1. As for universality, the AI chip should be able to adapt to various convolutional neural networks, including 1D/2D/3D convolution, dilated convolution, deconvolution, transposed convolution, depth-wise separable convolution, group convolution, shuffled convolution, flattened convolution, and deformable convolution. Although the basic operations of these convolutions are the same, different data transformations are required before convolution. Referring to FIG. 1, FIG. 1 illustrates the difference in data transformation modes between normal convolution and shuffled convolution.

2. The AI chip has large computing power and large bandwidth demand; with the model's accuracy continuing to increase, the cost is that the number of parameters and the amount of computation of the neural network increase sharply. Therefore, deep learning places high demands on processor performance and bandwidth. The processor should not only have the parallelism of data level and flow, be able to process massive data quickly and reduce the processing time, but also have the characteristics of high memory bandwidth to meet the real-time demand of large amount of data.

Generally, after a balanced design of power consumption, cost, and computation, the data bandwidth of the chip is determined, and at this time, it is necessary to improve the bandwidth from two aspects, including increasing bandwidth utilization rate and increasing data reuse rate. The former is to arrange data reading instructions reasonably, transfer data as much as possible at one time, and the interval between data transfers as short as possible, to improve bandwidth utilization rate; the latter is to make full use of the law of convolutional input data reuse, weight reuse, intermediate result reuse, as far as possible to reduce the number of data transfers.

3. As for power consumption, as convolution operation involves high-frequency data transfer and calculation, energy consumption is large, so energy consumption is usually one of the important evaluation indexes of the AI chip. The optimization method of energy consumption is to improve the reuse rate of data, reduce the data transfer, and optimize the convolution process under the premise of the determination of computing resources, to make balanced and efficient use of various resources.

Figure 2:
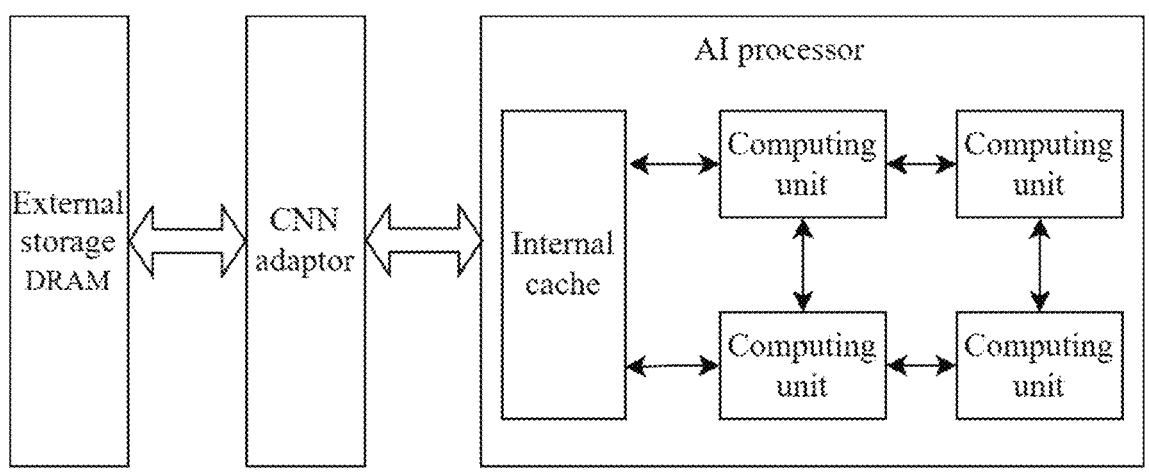
FIG. 2 is a structural diagram of a data processing system provided by one or more embodiments of the present application.

To solve the above problem, referring to FIG. 2, the present application adds an electronic device to the front end of an internal cache global buffer (or simply referred to as a buffer) of an AI processor (namely, an AI chip), and the electronic device may be referred to as a CNN adaptor (or a convolution adaptor), and the functions of data transfer, CNN network adaptation, and data reuse are completed by the convolution adaptor, which might not only improve the universality of the convolution module, but also improve the utilization rate of a data bus and the actual effective bandwidth, improve the convolution efficiency, and reduce energy consumption.

To achieve the above effect, the CNN adaptor transforms data in the process of data transfer from external storage to internal cache, so that the arrangement of data meets the requirements of subsequent computing modules. Thus, the basic function of the CNN adaptor is data transfer. Since different data types, or convolution types of convolution calculation, require different data transformation modes, it is necessary to design different data transfer modes for different data types or convolution types.

Figure 3:
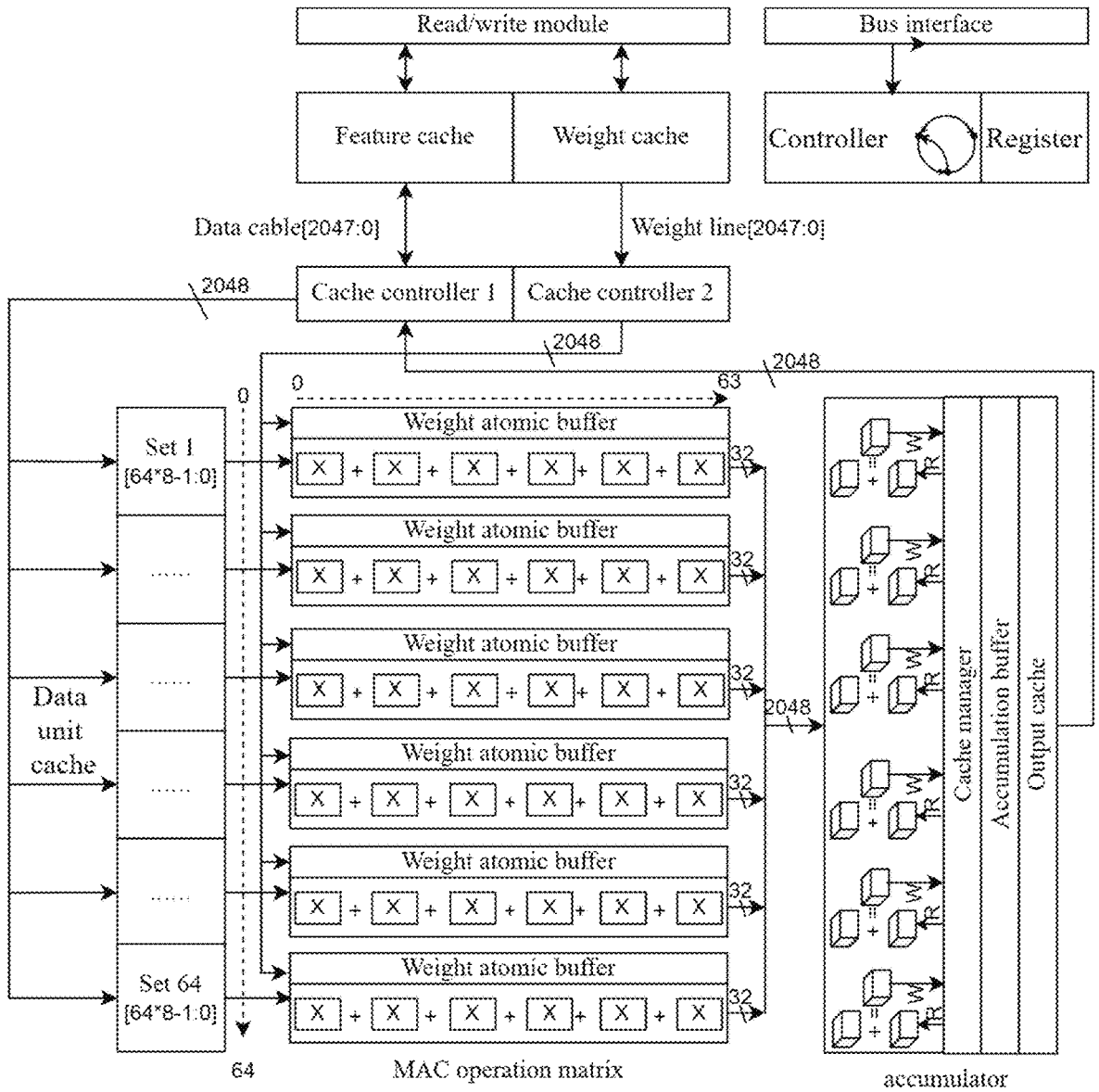
FIG. 3 is a structural diagram of a computing unit provided by one or more embodiments of the present application.

For example, if the subsequent computing unit of the CNN adaptor is a MAC matrix (MAC unit), referring to FIG. 3, the MAC matrix is Kvec row and Cvec column (64*64 in FIG. 3), that is, Kvec*Cvec*2 operations might be performed per clock cycle. The MAC unit uses feature reuse, weight reuse, and intermediate result reuse. Feature reuse refers to a data vector of length Cvec performing MAC operations with Kvec weight vectors of length Cvec through broadcast. The weight reuse refers to loading Kvec weight vectors of length Cvec and storing same in a weight atomic buffer, and performing MAC operations with a plurality of data vectors of broadcast of length Cvec in the next N clock cycles. Intermediate result reuse refers to an intermediate result (also referred to as a partial result) of a MAC operation that is stored in an accumulation buffer of an accumulation module (accumulator) and is accumulated with the next intermediate result until a complete result is obtained and then output. Thus, the three reuse modes reduce the feature read frequency, the weight read frequency, and the result write frequency, respectively, thereby reducing data bandwidth requirements.

Therefore, for a MAC operation matrix, namely, a MAC unit, the requirements for data arrangement thereof are:

1. The input data must all be vectorized data with a vector length of Cvec to meet the requirements of the input parallelism Cvec.

2. The output data is also vectorized data with a vector length of Kvec, which is determined by the output parallelism Kvec.

3. The input data satisfies the modes of data broadcast, weight reuse, and data reuse, namely, when reading, the data reads one vector per cycle, and the weight vector reads Kvec vectors in the N cycle, which requires that the Kvec weight vectors are arranged successively.

4. None of the data stored in the global buffer after reading needs to perform data transformation again, and is directly sent to the MAC unit to participate in the operation. Therefore, different convolution types require the CNN adaptor to convert the data arrangement order according to the convolution requirements when reading data to the global buffer (namely, the static random-access memory (SRAM) connected to the read/write module LOAD/STORE in FIG. 3).

The above is only a feasible data arrangement requirement for the MAC unit, and in combination with different types of data and different types of convolution calculation, the data arrangement requirement may be more complicated, and the manner of data transformation may also be more complicated.

Figure 4:
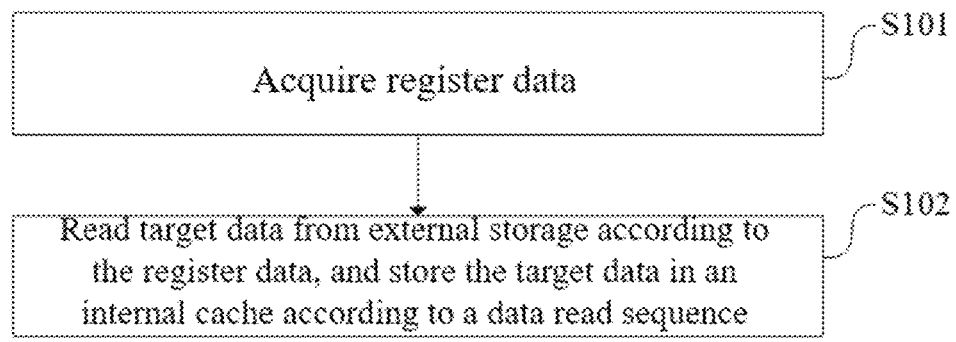
FIG. 4 is a flow diagram of a data processing method provided by one or more embodiments of the present application.

In some embodiments, to achieve the effect of data transfer, the convolution adaptor in the present application works based on register data. Referring to FIG. 4, the data processing method includes:

S101: Acquire register data.

S102: Read the target data from the external storage according to the register data, and store the target data in the internal cache according to a data read sequence.

It should be particularly noted that the register data in the present application has a special feature, and in particular, the register data is determined according to data types of target data and/or convolution types of convolution processing applied to the target data and is used for describing reading modes of the target data. By determining the deformation mode of the target data according to the data type and convolution type, since the mode of storing data into the internal cache is fixed, both being stored according to the read sequence, different data read modes are set according to the deformation mode, and each part of the target data is read out according to different sequences, that is, the deformation of the target data might be realized by reading and writing the data.

It might be seen therefrom that the content of the register data is used in the present application to determine the deformation mode of the data, and it might be understood that the generation mode of the register data is different according to the difference of the data type of the target data and the convolution type of the convolution calculation, and the specific generation mode will be described later.

In general, after the target data is arranged commonly in the external storage, it needs to be completely read in the calculation, and thus the read mode includes continuous reading and intermittent reading. The continuous read mode represents a mode without any deformation to the target data, and the intermittent read mode represents different deformation to the target data according to the difference of the specific intermittent method. In some embodiments, the register data includes jump stride data and jump cycle control data. The jump stride data is used for representing the size of the interval between every two continuous read data, for example, when the jump stride data is 2, after reading one data at the A address, reading the next data at the A+2 address, and so on. The jump cycle control data, including jump number control data and cycle control data; the jump number control data refers to how many times reading operations are performed in a cycle to re-determine a reference address, namely, a target address, to be read, and the cycle control data refers to how many times of reading operations are performed to stop this reading after how many cycles of reading operations are performed, or how many times of reading operations are performed in total. At the time of reading, the target address is determined according to the number of cycles, and in the external storage, a jump read operation is performed according to the target address and jump stride data. When the number of jumps of the jump read operation matches the jump cycle control data, the number of cycles is updated. If the number of cycles matches the jump cycle control data, it is determined that the target data read is complete.

For example, when the jump cycle control data is 3 (the jump number control data) and 2 (the cycle control data, in this case, the upper limit value of the cycle turn), when the jump stride data is 2, if the target address read for the first time is A, jumping for the first time once after reading the first data at the A address, reading the second data at the A+2 address, then jumping for the second time, reading the third data at the A+4 address, then jumping for the third time, when the number of jumps matches the jump cycle control data, the update number of cycles is 1. The target address is re-determined as A+1, then after reading the first data at the A+1 address, jump for the first time, read the second data at the A+3 address, then jump for the second time, read the third data at the A+5 address, then jump for the third time, the number of update cycles is 2, at this time the number of cycles matches the jump cycle control data, and the reading is completed.

It should be noted that the above is only one possible embodiment and that a specific embodiment may be simpler or more complex than the one described above, for example, it may be possible to set the number of clear cycles after how many cycles and to re-determine the new target address, and to determine that the data reading is completed after how many clear cycles. Alternatively, the specific jump stride of the read data for each cycle may be set, and the cycles for each turn may be different.

It might be understood that no matter what kind of data reading is performed, the CNN adaptor needs to realize the most basic data transfer function, and the data transfer function is used for realizing modular data transfer between a DRAM (namely, external storage) and an on-chip SRAM/Buffer (namely, internal cache), between peripherals and peripherals, and between a peripheral and a DRAM, and in some embodiments might enable the CNN adaptor to complete data transfer by configuring parameters, such as a source address, a destination address, and data volume of data in register data.

For a specific generation of register data, in some embodiments, a plurality of target data is provided, not completely contiguous in external storage (a data type may be referred to as address discrete data), in which case data stitching is required. The data stitching function is mainly used to realize the stitching effect in the row W direction, column H direction, and channel C direction data subjected to processing such as concat, join, merge, and append. In this case, a plurality of non-consecutive address intervals corresponding to the target data may be determined, and a plurality of sets of different register data may be generated according to the different address intervals. Each set of register data includes the next register pointer data for pointing to an address of the next set of register data. According to the sequential relationship of the address intervals, the next register pointer data in the register data is set to form a linked list, so that the next register pointer data in the previous set of register data points to the address of the next set of register data. During reading, when data reading with the previous set of register data is completed, it is possible to switch to the next set of register data and continue reading until reading is completed according to all the register data. It should be noted that the location of each target data in the internal cache may be continuous or discontinuous.

In some embodiments, if the target data needs to be split into a plurality of parts (the data type may be referred to as splitting type), that is, the storage location in the internal cache is not completely contiguous, or if the convolution calculation needs to split the data into a plurality of parts (the convolution type may be referred to as splitting convolution), for example, packet convolution or shuffled convolution ShuffleNet, then the data needs to be split. The data splitting function might in some embodiments split the data cube into a plurality of groups in the direction of channel C, and this function might be used for packet convolution and ShuffleNet; or divide the data cube into pieces on column H, suitable for piecewise convolution when the feature for convolution is too large and the hardware is not available. Alternatively, it might be a split of other channels and directions. In this case, a splitting direction of the target data may be determined according to a splitting manner of the target data, or a convolution type, and maybe, for example, a channel C direction, a row W direction, or a column H direction. According to the splitting direction, the jump stride data and the jump cycle control data might be determined, and then the register data is generated using the jump stride data and the jump cycle control data. In addition, this function might also be realized through the configuration of a plurality of sets of register data; to improve the efficiency of data transformation, the configuration of a plurality of sets of register data might be stored in the form of a linked list; when the data transformation controlled by the set of register data is in progress, the next set of register data is loaded; and after this data transformation is finished, the next data transformation is automatically activated.

Figure 5:
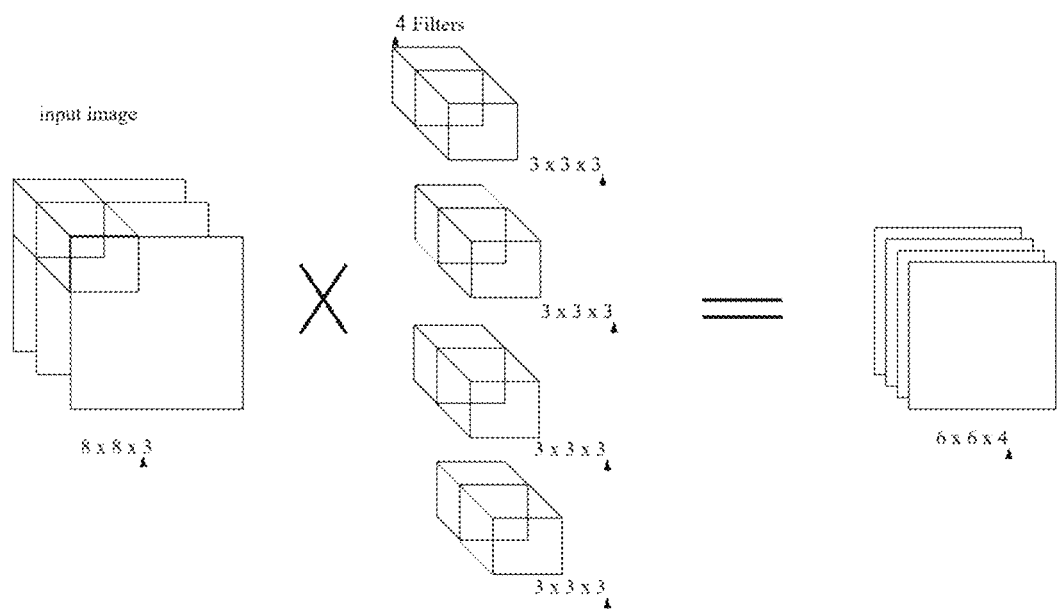
FIG. 5 is a diagram of a 3D data convolution process provided by one or more embodiments of the present application.

In some embodiments, the data type may be 2D data, such as data corresponding to text, or data corresponding to images under a single channel. Since the convolution calculation is essentially a matrix multiplication operation, the commonly used convolution operation is a 2D convolution operation on 3D data. Referring to FIG. 5, a data cube of C*H*W is convolved with the K filter (namely, convolution kernels) of C*R*S to generate a new data cube of K*P*Q size. Each filter slides along the W and H directions (namely, 2D convolution) on the input data cube, multiplies the data corresponding to each coordinate in the filter with the data corresponding to the position on the data cube, and then adds the same to generate data of size P*Q, and K filter results might obtain the data cube of K*P*Q.

Figure 6:
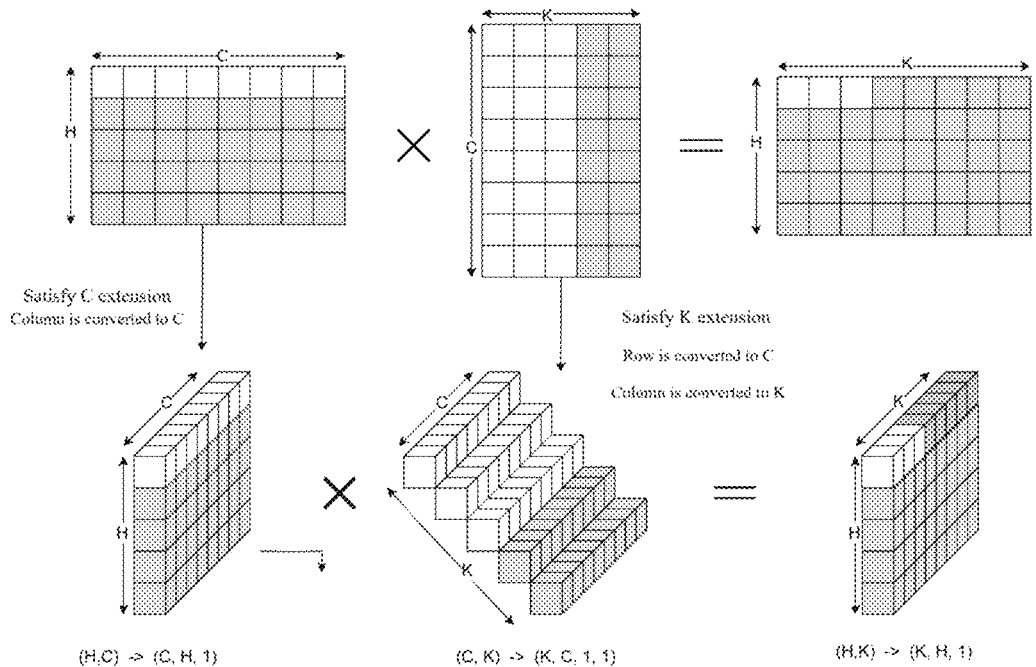
FIG. 6 is a diagram of 2D data transformation provided by one or more embodiments of the present application.

It might be seen therefrom that a general convolution computing unit (such as a MAC unit) is more suitable for a convolution operation of 3D data. However, in natural language processing (NLP), most of the computation is matrix multiplication, and the matrix has no dimension of channel C. In this case, computing matrix multiplication on a computing unit needs to convert a 2D matrix into a 3D data cube, to improve the calculation efficiency. Referring to FIG. 6, the transformation mode for the data is that the matrix transform data at the multiplicand position is arranged without rearranging the multiplier matrix and the output matrix. Since the size of the rows and columns of the matrix is fixed and the reordering rule is fixed, continuous data conversion might be achieved only by configuring a jump value (that is, jump stride data) and a reset boundary (that is, jump cycle control data) of each reading data. In some embodiments, when the register data is generated, if the target data is 2D multiplier data, the jump stride data and the jump cycle control data are set as default values without any transformation. If the target data is 2D multiplicand data, the jump stride data is set according to the number of row vector elements of the target data, and the jump cycle control data is set according to the number of column vector elements of the target data. That is, during each round of reading, data of one column in the C direction is taken, so it is necessary to set the jump stride data as the number of row vector elements, and after reading the $M^{th}$ data of the $N^{th}$ line, jump to the $M^{th}$ position of the $(N+1)^{th}$ line to read the data. When the number of jumps reaches the column vector element −1, the number of cycles is updated, and then the target address of reading is updated; reading continues from the $(M+1)^{th}$ data of the first row, and the process of jump reading is repeated until the data at the last column position of the last row is read.

Figure 7:
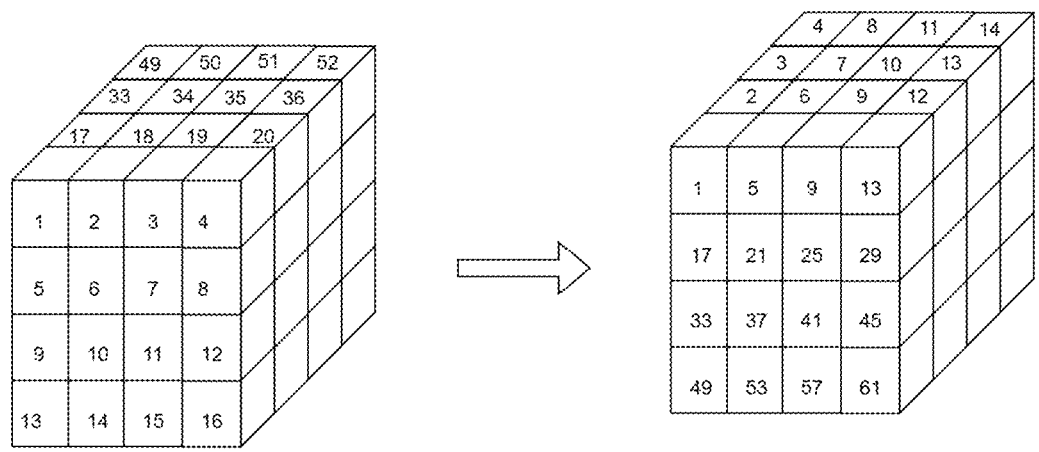
FIG. 7 is a diagram of data transformation in a channel expansion scenario provided by one or more embodiments of the present application.

In some embodiments, the effect of channel expansion may be achieved by setting specific values of register data. Continuing with the MAC unit, the input data is a vector of length W. Typically, the data in external storage is stored in the form of H*W*C so that the H*W*C data needs to be converted to C*H*W data and vectorized in the direction of channel C before convolution. In some embodiments, referring to FIG. 7, each number represents an index address of an element of the position in a memory, for example, data with an address of 17 originally in external storage is converted into an address of 2 in an internal cache, namely, the storage order changes, and to achieve the effect, reasonable register data is required, for example, jump stride data and jump cycle control data.

Figure 8:
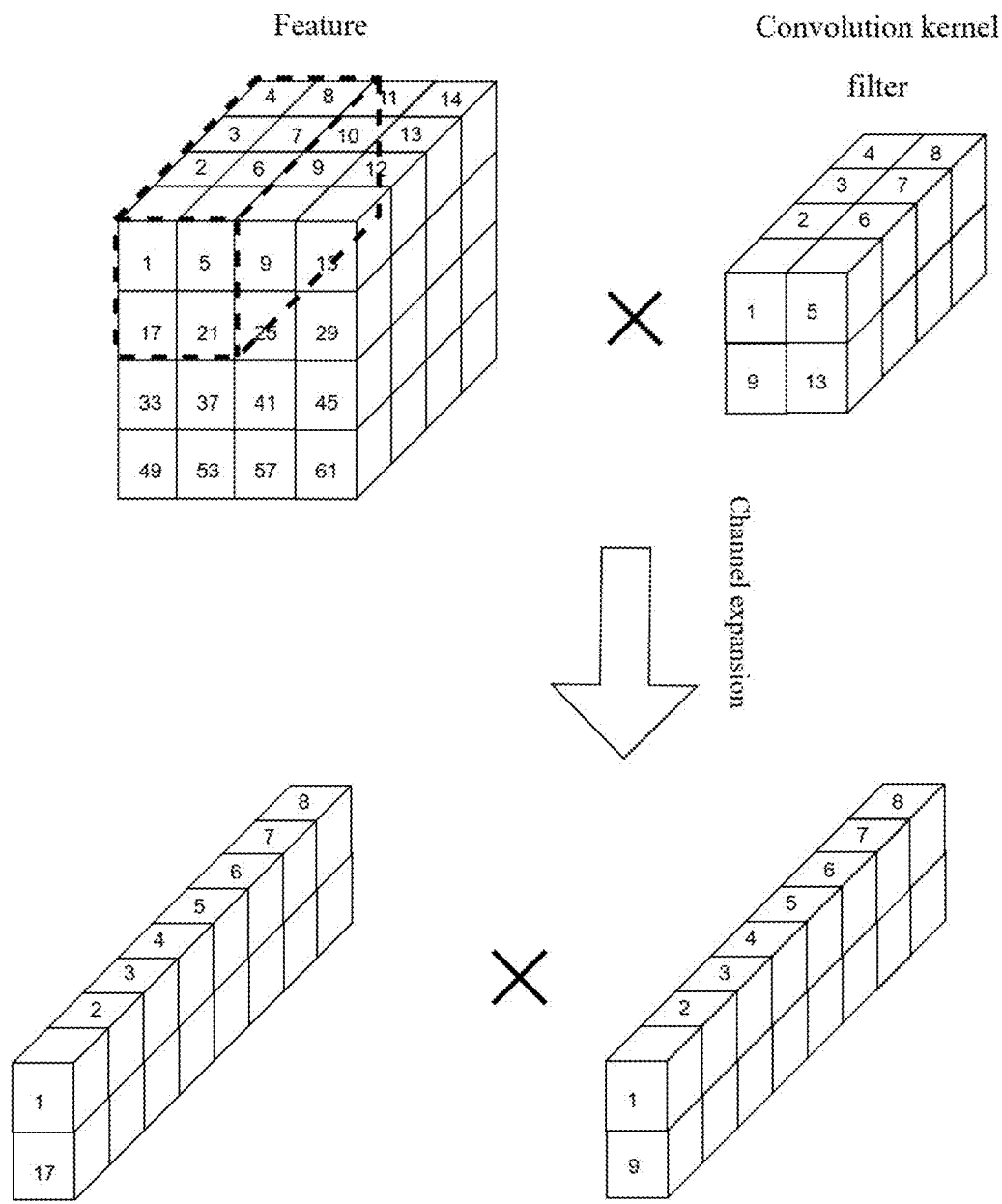
FIG. 8 is a diagram of data transformation in a channel expansion scenario provided by another one or more embodiments of the present application.

According to the requirements of MAC, the vector length of data is Cvec, and it is assumed that Cvec is 8, when the situation shown in 7 occurs, the number of elements in the direction of channel C is less than 8. In this case, if no other processing is performed, directly taking 4 elements on one channel to participate in the operation will result in the ½ multiplier in the MAC unit has no input data and is in an idle status, which will not only result in low calculation efficiency but also result in high energy consumption. At this time, the data might be subjected to channel expansion. Referring to FIG. 8, data from a plurality of channels corresponding to the same filter is stitched, and elements in the direction of channel C are changed from 4 to 8. For example, according to FIG. 8, a vector of 1, 2, 3, and 4 and a vector of 5, 6, 7, and 8 might be combined into a new vector to expand the channels and improve the multiplier utilization rate of the MAC. FIG. 8 shows the channel expansion in the x-direction by stitching together two channels in adjacent x-directions. In addition, according to needs, the channel might also be expanded in the y direction, the principle is the same, and the implementation process is that the vectorization in the above drawing might be accomplished by implementation of 2D data transformation, the implementation of channel expansion in the x-direction is similar to the implementation of data stitching or splitting. It should be noted that the feature and filter input are the same, and if they are changed, they need to be changed simultaneously, and only one of them might not be changed. In addition, according to the stride (that is, the stride of the convolution kernel translation), the read data may be reused; taking the cube data in the upper left corner of FIG. 8 as an example, when the stride=1, data corresponding to three positions of 5, 17, and 21 may be reused in a subsequent transformation; therefore, it is necessary to calculate the interval for the occurrence of the reused data and the number of reuse according to the size of the filter, the size of the stride, the channel size, and the Cvec size configuration of the MAC unit, thereby generating corresponding register data and thus generating corresponding transformation data.

Figure 9:
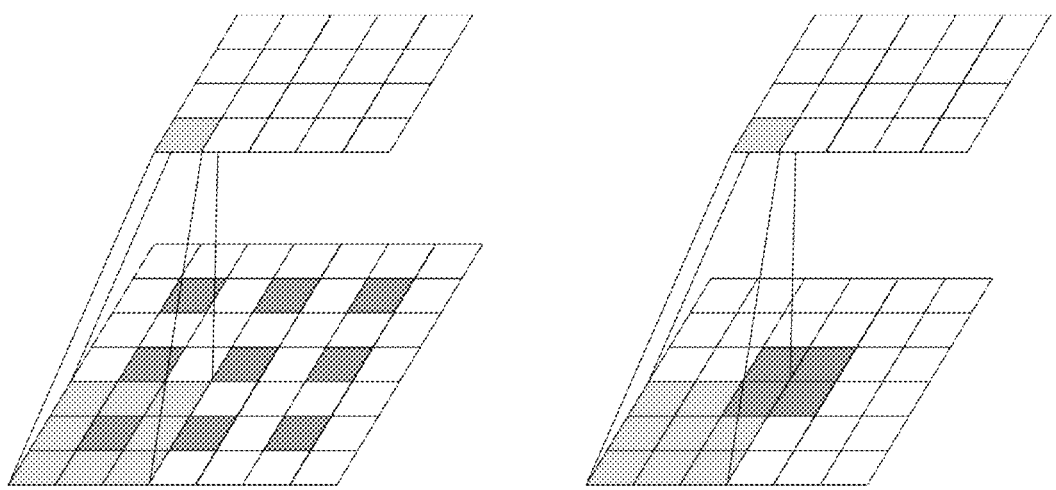
FIG. 9 is a diagram of data transformation in a deconvolution scenario provided by one or more embodiments of the present application.

In some embodiments, the convolution type of the convolution processing may be deconvolution, which in Caffe, pytorch, and the like typically operates according to the method of FIG. 9: the dark squares in the lower 2D matrix are the input feature map, the light squares in the lower 2D matrix represent the convolution kernel filter, and the upper 2D matrix is the convolved output feature map. A dashed box is an inserted neutronium or an interspersed neutronium for padding processing. It might be seen therefrom that in Caffe and PyTorch, an input feature is extended by performing padding neutronium processing or interspersing neutronium processing on an input feature map, and then a convolution operation is performed in a manner that stride is 1. This method needs to intersperse a large number of neutronium in practical application, but in the calculation, the convolution value of neutronium with filter is zero, which wastes a large amount of hardware storage resources and calculation resources, so that the calculation efficiency is low.

To solve this problem, the present application decomposes a convolution kernel, and in some embodiments includes the following steps:
1. Filter is decomposed into x_stride*y_stride parts.
2. The decomposed filter is arranged in reverse order.
3. Each filter is subjected to convolution operation with the input feature.
4. The results are stitched in the channel direction.
5. The stitched data cube is then expanded according to stride_x and stride_y.

That is, a horizontal jump stride x_stride and a vertical jump stride y_stride are firstly determined, followed by using the horizontal jump stride and the vertical jump stride to determine a convolution matrix (namely, a decomposed filter) according to a convolution kernel. The register data is generated based on the coordinate positions of the elements of the convolution matrix in the convolution kernel such that the subsequently read target data might be subjected to convolutional multiplication with the decomposed convolution matrix.

Figure 10:
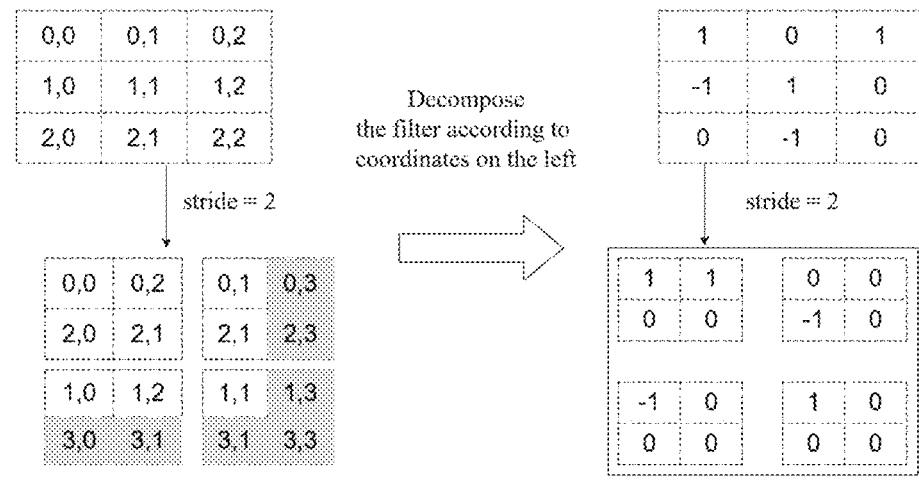
FIG. 10 is a diagram of data transformation results in a deconvolution scenario provided by one or more embodiments of the present application.

Referring to FIG. 10, a 3*3 filter, stride_x, and stride_y are all 2, and the filter is decomposed into 4 filters; since the sampling strides in the x and y directions are both 2, 3 of the 4 filters obtained include elements which are not in the original filter, namely, (0,3), (2,3), (3,0), (3,2), (1,3), (3,1), and (2,3), and these newly-appearing identification index values exceed the boundary of the original data and need to be filled with 0. To the right of the arrow is the decomposition of the original filter and its corresponding 4 filters. After determining the decomposed filter, register data corresponding to the filter element (namely, weight data) might be generated, so that when using the register data to transfer filter data, only valid elements therein are acquired and a split filter is constructed, and then the calculation is performed.

Figure 11:
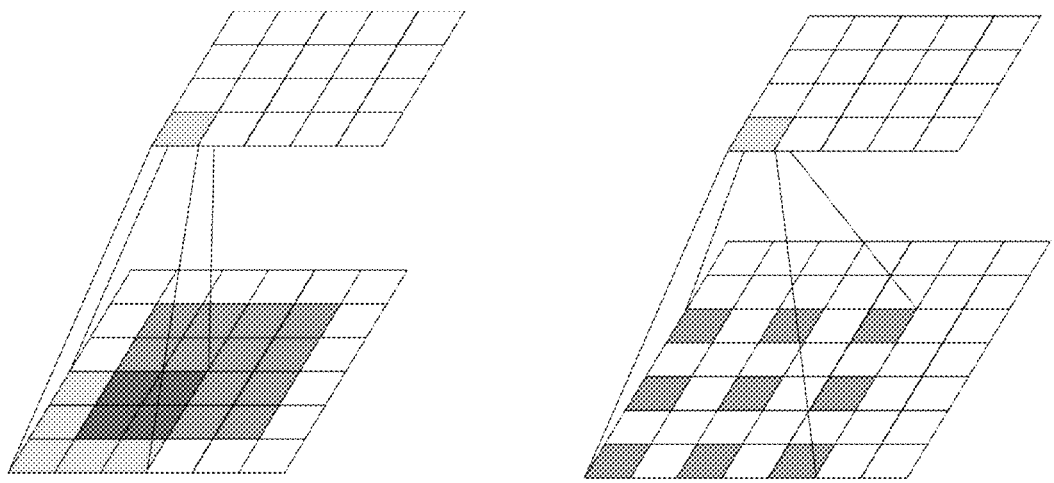
FIG. 11 is a diagram of data transformation in a dilated convolution scenario provided by one or more embodiments of the present application.

In some embodiments, the convolution type may be dilated convolution. The basic idea of dilated convolution is to enlarge the size of the convolved filter so that a larger range of input data is used per calculation, that is, a larger "field of view". Referring to FIG. 11, FIG. 11 shows a comparison of a normal convolution with dilated convolution (normal convolution on the left and dilated convolution on the right). Change of the dilated convolution is that the starting value of each element in the filter is the original dilate_rate times, and the dilate_rate might be referred to as a dilated multiple, and the dilated multiple in FIG. 11 is 2, and the others are similar to common convolution. Therefore, the key to data transfer and deformation for dilated convolution is to locate the corresponding feature value of the filter according to dilate_rate. For example, the coordinate origin might be taken as the filter element in the upper left corner, and the initial index value of the feature is dilate_rate times of the filter element relative to the coordinate origin. When generating register data, a dilated multiple is first determined, followed by determining jump stride data and jump cycle control data according to the dilated multiple and then generating the register data using the jump stride data and the jump cycle control data. In the right diagram of FIG. 11, the upper 2D matrix is a filter, the lower 2D matrix is an input feature map, and the dark squares in the lower 2D matrix are parts corresponding to each element in the filter.

Figure 12:
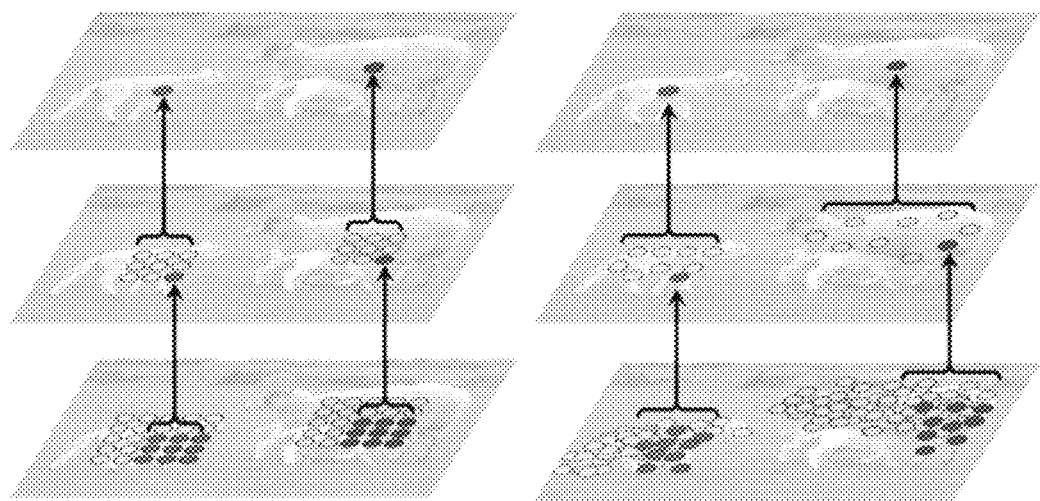
FIG. 12 is a diagram of a data acquisition process during deformable convolution provided by one or more embodiments of the present application.
Figure 13:
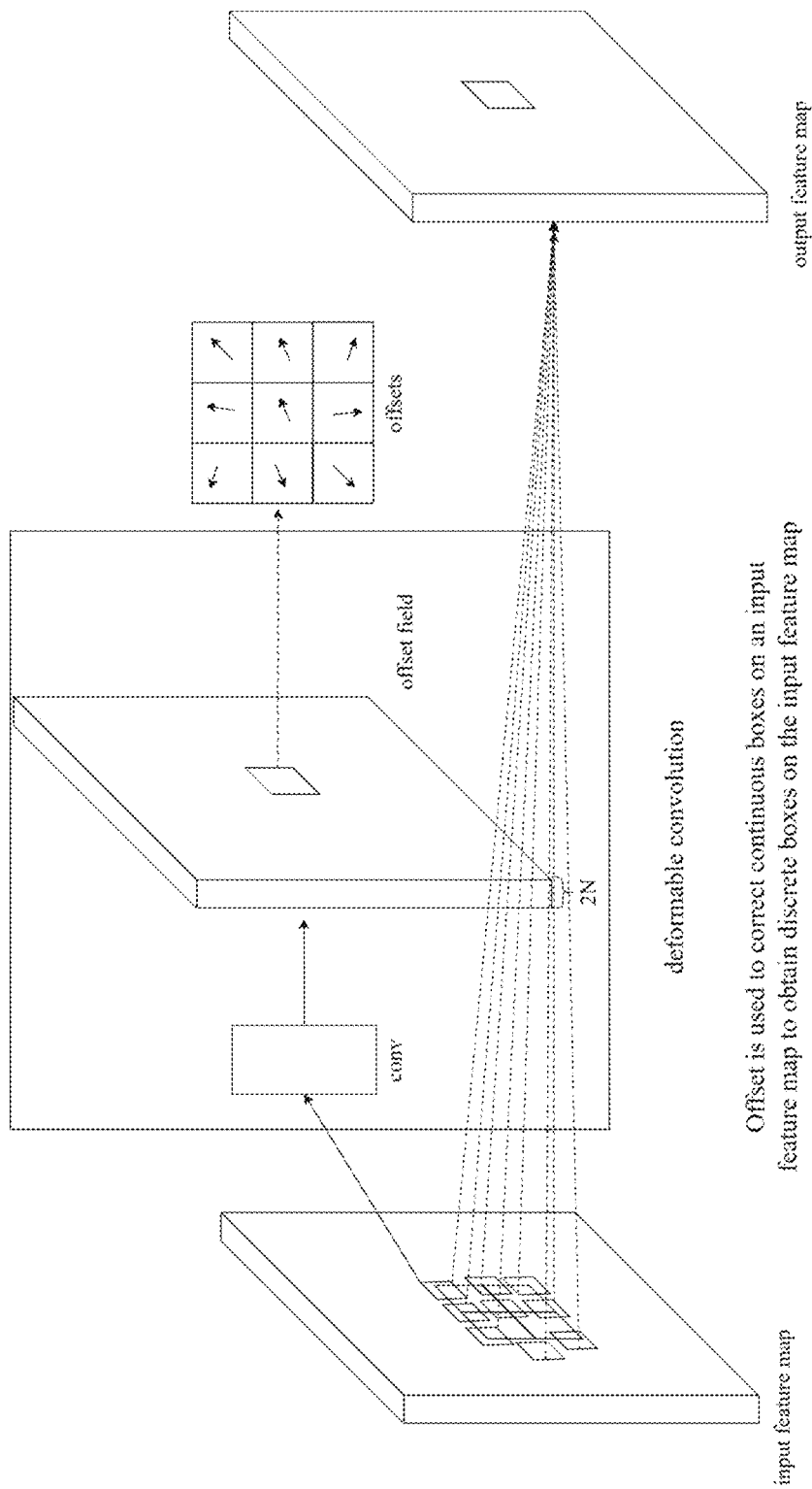
FIG. 13 is a flow diagram of deformable convolution provided by one or more embodiments of the present application.

In some embodiments, the convolution type may be deformable convolution. Referring to FIG. 12, FIG. 12 shows a comparison of a standard convolution (left), which does not efficiently extract image features when the input image has a distortion, and a deformable convolution (right), which might accommodate the distortion of the image. The reason is that the loss (that is, the loss value) is minimized by training the offset of the standard convolution pixel while the deformable convolution is trained. Thus, the training results in not only the weight model data needed for convolution but also the model weight values needed to obtain the offset values. Referring to FIG. 13, before the convolution calculation of each layer is started, the convolution calculation of offset is first performed, and the obtained offset is used for correcting the region where the feature map is selected so that the selected region is closer to the target. In some embodiments, the CNN adaptor needs to add a convolution result feedback input port to read the offset value (that is, offset distance) to modify the address at which the CNN adaptor reads the feature data. In some embodiments, the offset distance may be included in the register data, so when generating the register data, the reference coordinates and the offset distance of the target image are first determined, and the register data is generated using the reference coordinates and the offset distance.

In some embodiments, to improve the data reuse rate, and reduce the number of data transfers, thereby improving the calculation efficiency and reducing energy consumption, a local cache is provided in the convolution adaptor, and cache flag data corresponding to each sub-data in the target data is correspondingly provided in the register data. During the data transfer, a corresponding execution step might be determined according to the status of the cache flag data. If the cache flag data is not in a non-cache status, it indicates that the sub-data is not cached locally, and then the sub-data might be saved to a local cache. If the cache flag data is in the output status, the sub-data might be directly stored in the internal cache, to realize data transfer from the local cache to the internal cache, without acquiring data from the external storage.

Applying the data processing method provided by the embodiments of the present application, a separate convolution adaptor is provided between the external storage and the internal cache, and the convolution adaptor operates according to the register data, and the register data is used for describing the reading mode of the target data, which is determined according to the data type of the target data and/or the convolution type of the convolution processing. The convolution adaptor reads the target data from the external storage according to the control of the register data and stores the target data in the internal cache in the order of data reading. By setting different register data, the target data might be read in different ways, and since the target data is written into the internal cache in the read sequence of the data, the form of the target data in the internal cache is related to the read mode, and the target data might be stored in a common form in the internal cache. Through the data read mode corresponding to the data type or convolution type, the conversion from the target data to the common format is completed in the process of data reading and storage, so that the computing unit might directly obtain the target data in the common format from the internal cache for calculation, without data deformation, and the calculation efficiency is improved.

Figure 21:
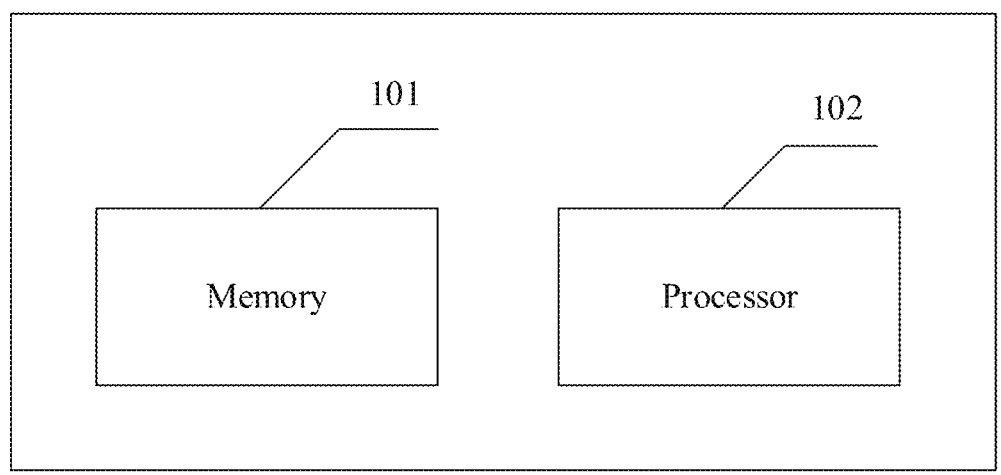
FIG. 21 is a structural diagram of an electronic device provided by one or more embodiments of the present application.

Referring to FIG. 21, the electronic device provided by the embodiments of the present application is described below. The electronic device 100 may be, for example, a convolution adaptor. The convolution adaptor described below and the data processing method described above may be referred to concerning each other.

The electronic device may include a processor 101 and a memory 102, and may further include one or more of a multimedia component, an information input/output (I/O) interface, and a communication component, as desired. The processor 101 is configured to control the overall operation of the electronic device to complete all or part of the steps in the data processing method of any one of the above embodiments; memory 102 is configured to store various types of data to support operation at the electronic device, which may include, for example, instructions for any application or method operating on the electronic device, as well as application-related data. The memory 102 may be implemented by any type or combination of volatile or non-volatile memory devices, such as one or more of SRAM, electrically erasable programmable read-only memory (EE-PROM), erasable programmable read-only memory (EPROM), programmable read-only memory (PROM), read-only memory (ROM), magnetic memory, flash memory, magnetic or optical disks.

Figure 14:
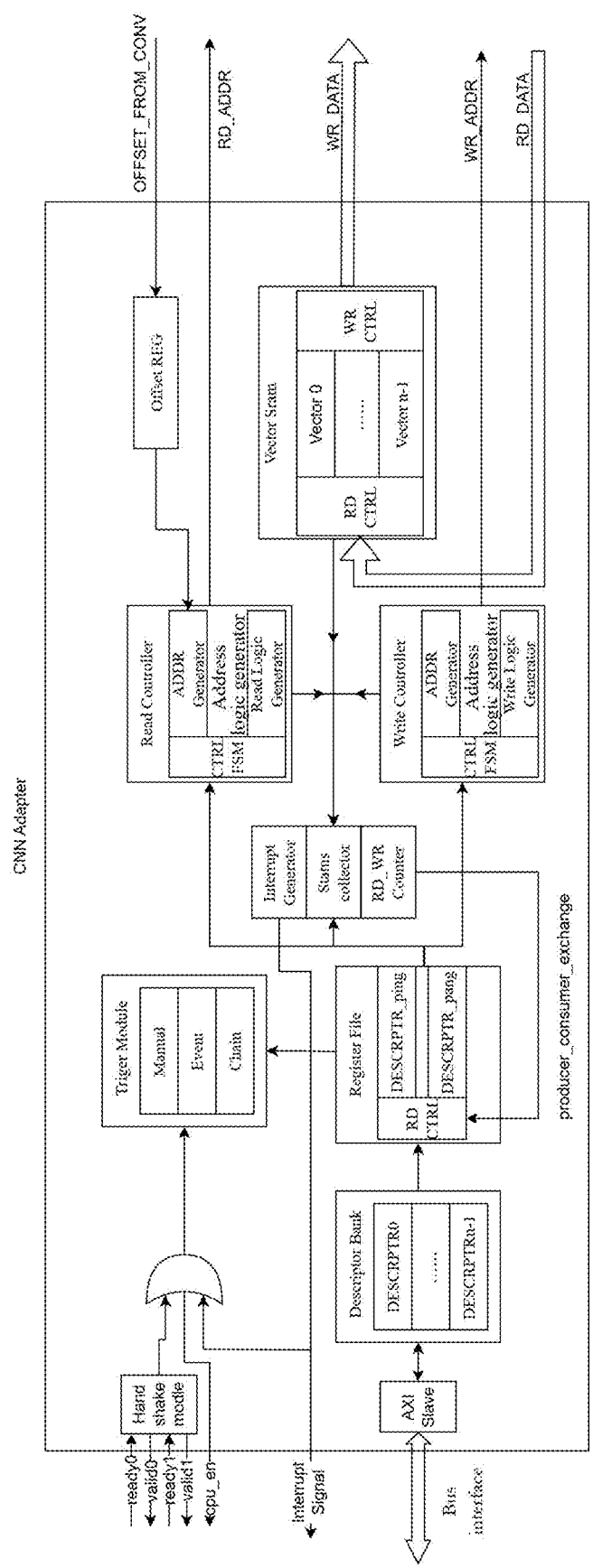
FIG. 14 is a structural diagram of an electronic device provided by one or more embodiments of the present application.

In some embodiments, referring to FIG. 14, FIG. 14 is a structural diagram of a convolution adaptor provided by an embodiment of the present application. The CNN adaptor includes an interface (a register configuration interface (namely, an interface of a register configuration module, register file), an interrupt (namely, interrupt generator), a data read/write interface (namely, an interface of a data read controller and a data write controller), deformable convolution offset data interface (namely, offset_reg)), and a hand shake module, a trigger module, a register data memory (also referred to as an operation description linked list cache, e.g. descriptor bank), a register (register file), a status monitoring unit, a data reading unit (namely, a data read controller), a data write unit (namely, a data write controller) and a Vector Sram (a data cache, namely, a local cache, which may also be referred to as a data vector buffer). In some embodiments:

(1) Descriptor Bank

The module is configured to store the action descriptor of the CNN adaptor, that is, the register data and a descriptor describes the configuration required by the adaptor to transfer the data once. In some embodiments, referring to FIG. 15 for the format of descriptor, a descriptor contains 12 (in other embodiments, may not be limited to 12) 32-bit (in other embodiments, may not be limited to 32-bit) registers.

The registers are described as follows:

NXTDESCPTR: The address of the next descriptor, that is, the next register pointer data, is a pointer connected to the next descriptor, and when the adaptor operates in a chain mode (that is, a linked list mode), the next descriptor is found according to the pointer, and then the next data adaptation is activated without central processing unit (CPU) participation.

SRC_ADDR represents a source address of the target data.

DST_ADDR represents a destination address of the target data.

CTRL_REG represents a control register configured to configure an interrupt enable (EN) of an adaptor, an increment of a source data address, an increment of a destination address, a data type, a convolution type, a stride type, a value of padding, and an extension parameter of a channel extension in x and y directions, and the like.

CONFIG_REG represents configuration registers, configuration hand shake signals, and data valid bit width.

Status_REG refers to recording the status of this transmission, which is modified by the status unit and is a read-only register.

SRC/DST_***_stride represents a jump stride in three dimensions of x, y, and z, which has a plurality of functions, and is controlled by a control register CTRL_REG; the functions in some embodiments include:

address jump of CNN adaptor after reading a frame;

jump stride_x in the x direction and jump stride_y in the y direction required for data splitting during deconvolution; and jumps in three dimensions of high H, wide W, and channel C involved in 3D data splitting.

Figure 16:
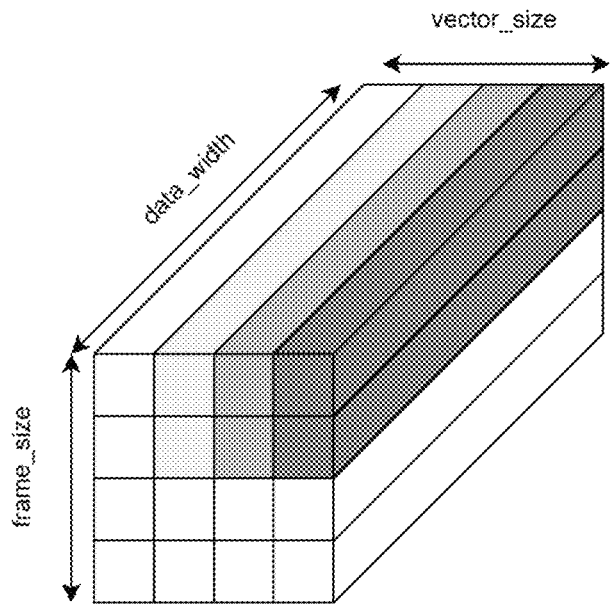
FIG. 16 is a diagram of corresponding relationship between 3D volume data and register values provided by one or more embodiments of the present application.

Frame information includes PAD_0_VEC_SIZE, FRAME_SIZE, VECTOR_SIZE, PAD_1_VEC_SIZE, with the following functional descriptions:

Referring to FIG. 16, one layer is a frame, FRAME_SIZE is 4, and vector_size is 4. data_width is the data bit width and usually also the effective bit width of the bus (to increase the bus bandwidth, the bus bit width is usually set to element_size*element_width, for example, if the vector size of the MAC unit is Cvec and the element is int8, the bus bit width is usually set to N times Cvec*8, N=1,2,3, . . . ). PAD_0_VEC_SIZE and PAD_1_VEC_SIZE are used for indicating that there are PAD_0_VEC_SIZE vectors on the left side of the frame are padding (that is, inserted neutroniums) and PAD_1_VEC_SIZE vectors on the right side are also padding in the case where the input data has padding, and then FRAME_SIZE needs to add two padding values (that is, PAD_0_VEC_SIZE and PAD_1_VEC_SIZE). This arrangement is very useful. According to the investigation of CNN, there are many neural networks whose inputs need to do padding processing, and padding processing is also needed in the data splitting of deconvolution. Obviously, in the data processing, adding the padding value to the register data might make the logic of subsequent convolution calculation simpler, without needing to pay attention to whether there is padding.

Figure 17:
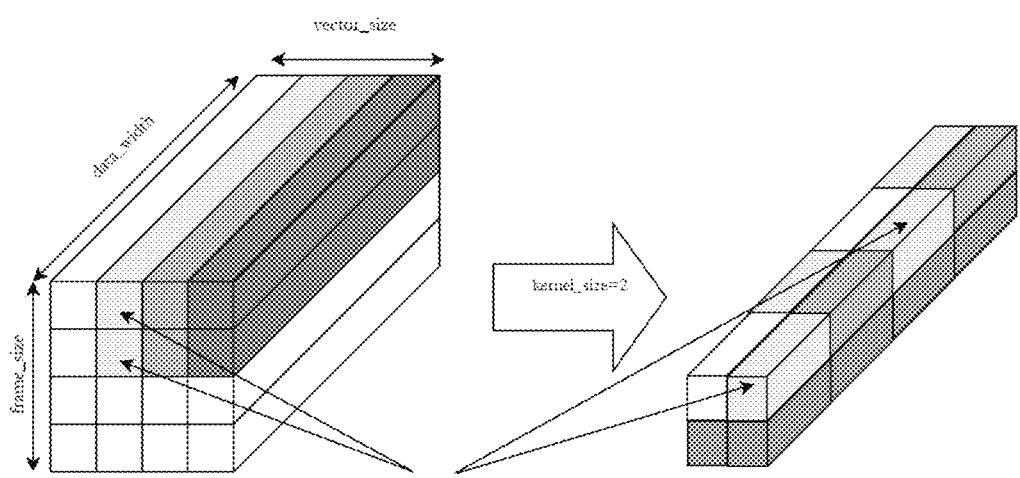
FIG. 17 is a reused data representation diagram provided by one or more embodiments of the present application.

VECn_REUSE is a register used for indicating whether data is reused in a channel extension scenario, and the register holds a count value, marking the number of vector intervals from the first use to the second reuse. Referring to FIG. 17, the size of filter is 2*2 and the stride is 1, and two channel extensions before and after are reused to the data indicated by the arrow. To avoid repeatedly reading the data from the external storage, whether the data is reused and how many vectors the reuse interval is, might be recorded using the VECn_REUSE. Continuing with the example of FIG. 17, the second vector in the first frame is reused with a reuse interval of 4, so when the adaptor writes the vector, it is written twice to the address with an interval of 4*data width. This reduces the bandwidth requirement in disguise.

It will be appreciated that a local cache is also included in the convolution adaptor for storing the target data or sub-data including the target data, such as the sub-data indicated by the arrows in FIG. 17.

(2) Register File

A register file is a register set and a control logic module, and the number of register sets included therein may be one or more. To improve the efficiency of data processing, the number of register sets may be plural, each register set includes a plurality of registers, and each register set is used for recording a set of register data. In this case, in the progress of register data in one register set being applied to data transfer, additional register sets may be loaded with other register data.

Figure 18:
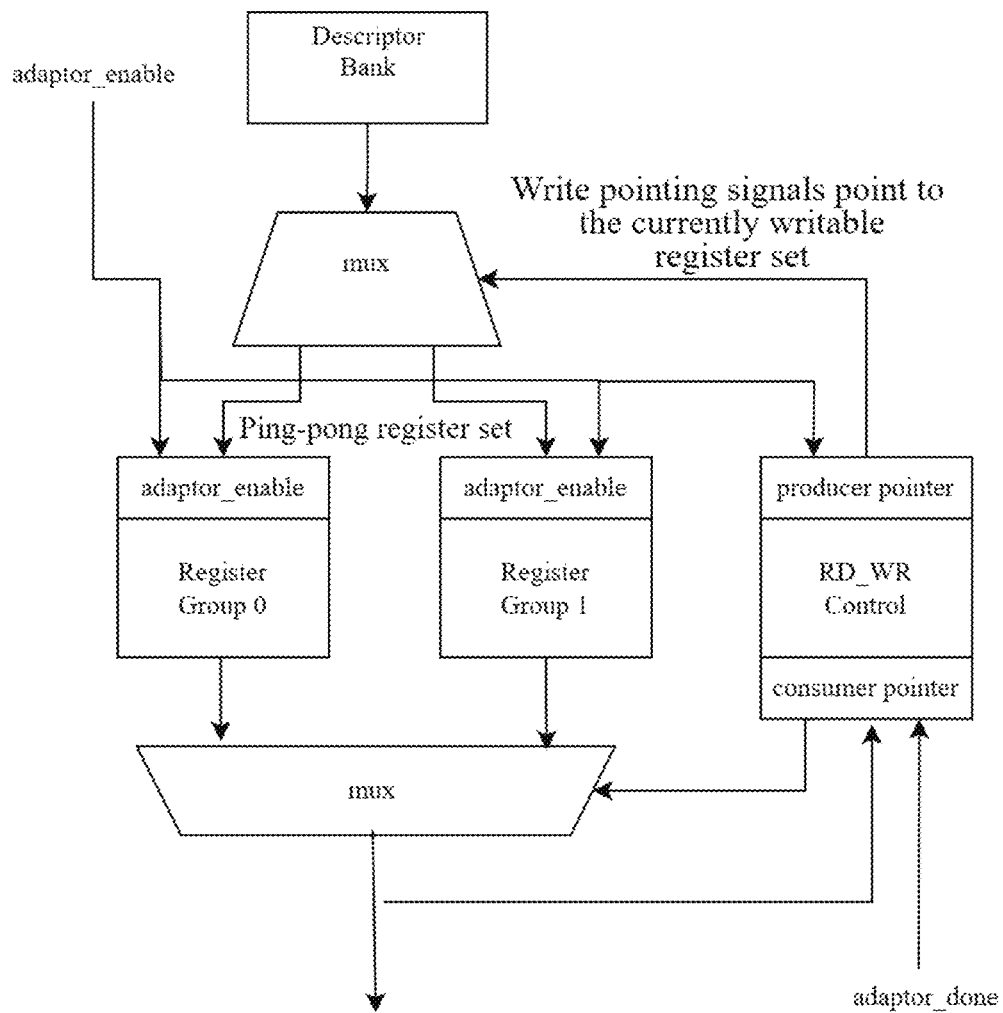
FIG. 18 is a structural diagram of a ping-pong register set provided by one or more embodiments of the present application.

In some embodiments, the number of the register sets is two, and the two sets are mutually ping-pong register sets. Register file includes one ping-pong register set, and each set of registers caches one descriptor, and the structure is as shown in FIG. 18. A read/write control logic module is provided in the Register file, and the module switches the register output source according to the done signal of the adaptor, and switches the input source according to the EN signal of the adaptor, so that it might be ensured that when data is transferred, the adaptor might control the register set to read the descriptor of the next operation, so that the previous and next data transfers are linked without interruption.

(3) Read/Write Controller

The data read/write controller, that is, the above data read unit and data write unit, which may also be referred to as a read/write controller, is configured to control a read/write register set, or configured to control read/write target data, is a key of the adaptor, and the main control logic is implemented in these two modules. Read Controller generates a read data address and corresponding control logic according to a data source address, Frame_size, Vector_size, and the like in the register data, and configuration information, such as an address increment and burst size configured in config_reg. The read data is written into the Vector Sram (that is, local cache). The information that needs to be referred to by the write controller, such as the amount of read data, is synchronously transferred to the write controller via FIFO.

The Write Controller reads the data in the Vector Sram according to the write data configuration in the register data, such as write address, jump, data volume, and padding information before sending to the AXI interface for writing to the internal cache, and feeding back the status to the status unit. In addition, when the Write Controller writes data, it is determined whether it needs to write to another address again according to the VECn_REUSE in the register data.

It should be noted that VECn_REUSE is a register configured for channel expansion, and when the number of input feature map channels is much smaller than the Cvec at the MAC end, it is necessary to expand the channels of the feature map to improve the efficiency of MAC operation. Typically, the filter size is 1*1, 2*2, or 3*3, so the reused vector data is typically less than 8, so the maximum number of VECn_REUSE might be set to 8.

In channel expansion mode, read controller automatically adjusts the vector size according to the channel expansion parameters. If the channel extension parameter in the x direction is 2, the extension parameter in the y direction is 2, and the stride is 1, it means that the adaptor is required to read a total of four vector data on the right side, the lower side, and the lower right side of the current vector to constitute a channel. The read controller reads these four vectors and passes the relevant information to the write controller via FIFO. The write controller writes four vectors to the same channel based on the information and writes the data to be reused at another address based on VECn_REUSE.

The read controller will store the address of the reused data in the internal cache, and when the address of the read data is the same as the data address in the buffer, it will automatically jump to the next address to read the data, omitting the reading of the current data.

Figure 19:
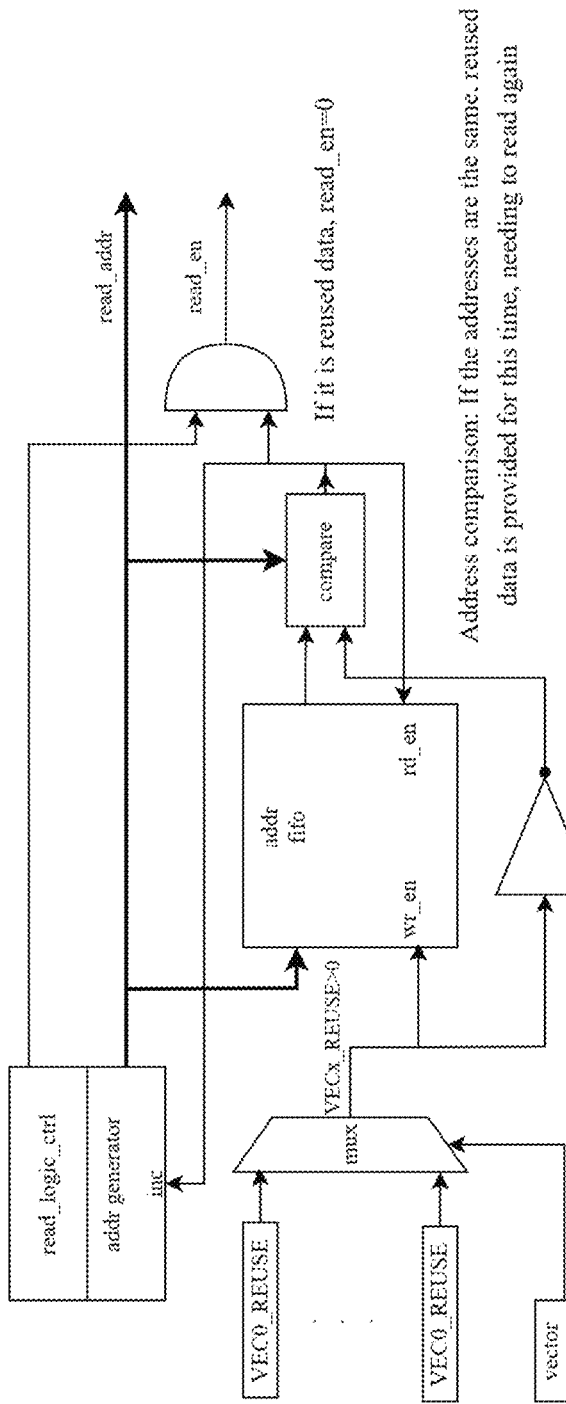
FIG. 19 is a structural diagram of a read controller provided by one or more embodiments of the present application.

Referring to FIG. 19, the overall process is as follows: judging whether the read data is reused data; if yes, caching the address of the read data in the addr_FIFO; no, EN the address comparison, if the address of the read data this time is the same as the address of the FIFO, the add generator is triggered to generate the next address, the data read_en of the current address is set to 0, and the addr_FIFO is triggered to read the next address onto the bus for the next address comparison.

Reuse of data might be achieved by simple logic and FIFO of 8 data capacities, avoiding repeated reading of data. It is mainly noted that data is reused only in the channel expansion mode, and the number of data reuse does not exceed 8, and the data reuse order is the order of reading data and might not be reused out of order.

(4) Vector Sram

The data cache is configured to buffer asynchronism between the adaptor data reading and data writing, and in a non-channel extension mode, the addresses of data writing and reading are continuously accumulated, to prevent the order error of data writing and reading. When the address accumulation reaches the maximum value, it returns to zero and starts again.

It should be noted that the current descriptor execution completion judgment shall include read data complete, write data complete, and Vector Sram being empty. If all three are true (that is, all three conditions are true at the same time), descriptor execution is complete and an interrupt signal is generated.

(5) Status Unit

The unit collects the status of read_controller, write_controller, and vector_sram, synthesizes them, and generates the corresponding status signal to characterize the working status of the CNN adaptor.

(6) Offset_Reg Unit

The offset distance acquisition component is configured to acquire the offset distance when the convolution type is deformable convolution. The unit is an offset specially configured to configure deformable convolution, and it might be seen from the above deformable convolution that when reasoning, the deformable convolution generates an address offset example corresponding to the selected input feature map in real-time so that the input field of view is closer to the target.

Offset_reg unit uses a ready/valid hand shake signal; when a convolution module after the adaptor outputs an offset address, the read_controller and the offset_reg units search for the same deformable convolution time sequence; at this moment, the read controller reading data is consistent with the target data of offset_reg; and the offset_reg outputs an offset of the data, and superimposes same on the reading address of the read controller, to jointly complete the task of reading data.

(7) Trigger_Module

The trigger mode selection module, referred to as a triggering component, is configured to trigger the activation of the convolution adaptor, by which the adaptor might be configured to operate in a trigger mode such as a manual trigger, an external event trigger, and an internal chain mode trigger.

The manual trigger is triggered by writing an EN signal; each time a task of a descriptor is executed, and a signal of whether success or not is returned.

The external event trigger might be a trigger such as a timer, a peripheral event, and a CPU interrupt; each time a task of a descriptor is executed, a signal of whether success or not is returned.

The internal chain mode is to configure a plurality of descriptor at once, and each descriptor has a pointer to execute the next descriptor; after activating adaptor, the tasks of a plurality of descriptor are automatically completed.

(8) Hand Shake Module

When the task executed by the adaptor is directly related to a peripheral and not strongly related to the CPU, the adaptor might be directly connected to the peripheral through the hand shake module, and interact with the event of the peripheral through the hand shake module, thus avoiding the indirect participation of the CPU, improving the coupling between the adaptor and the peripheral, and improving the working efficiency.

It should be noted that the above various modules may be deleted or modified according to needs, and the connection relationship between various modules is not limited and might serve corresponding functions, for example, in some embodiments, the connection relationship shown in FIG. 14 may be provided.

The following describes the data processing apparatus provided by an embodiment of the present application, and the data processing apparatus described below and the data processing method described above may be referred to correspondingly.

Figure 20:
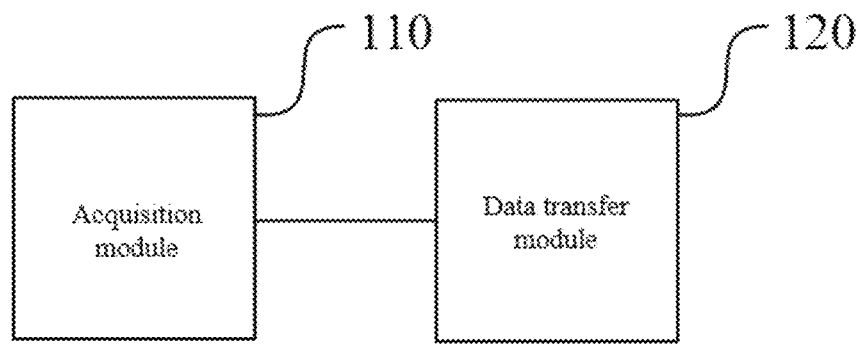
FIG. 20 is a structural diagram of a data processing apparatus provided by one or more embodiments of the present application.

In some embodiments, referring to FIG. 20, FIG. 20 is a structural diagram of a data processing apparatus provided by an embodiment of the present application; the data processing apparatus is applied to a convolution adaptor, and the convolution adaptor is arranged between the external storage and the internal cache of a computing unit; and the apparatus includes:

an acquisition module 110, configured to acquire register data, where the register data is determined according to data types of target data and/or convolution types of convolution processing applied to the target data, and is used for describing reading modes of the target data; and a data processing module 120, configured to read out the target data from the external storage according to the register data, and store the target data in the internal cache according to a data read sequence.

A computer-readable storage medium provided by an embodiment of the present application are described below, and the computer-readable storage media described below and the data processing method described above may be referred to correspondingly.

Figure 22:
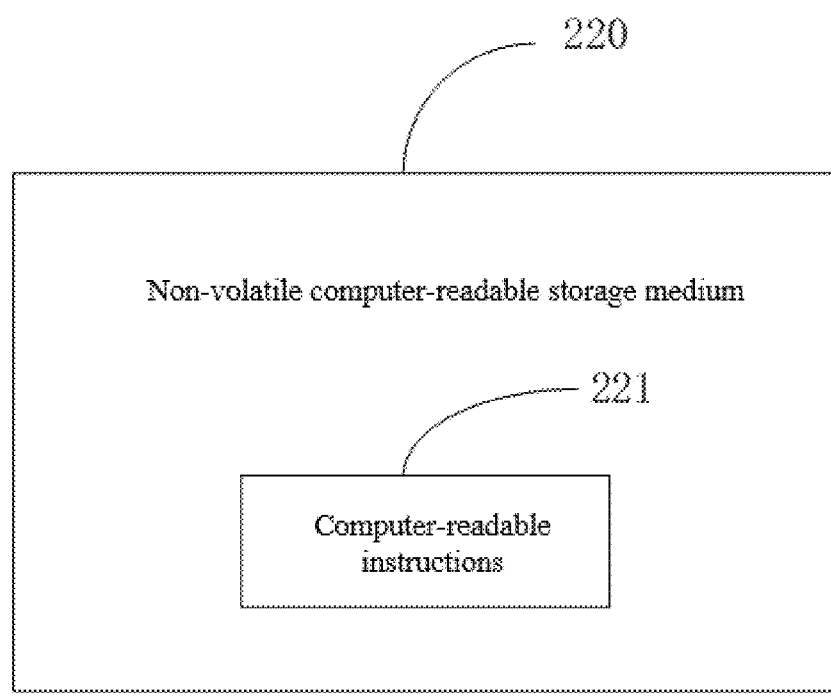
FIG. 22 is a structural diagram of a non-volatile computer-readable storage medium provided by one or more embodiments of the present application.

In some embodiments, referring to FIG. 22, there is also provided a non-volatile computer-readable storage medium 220 storing thereon computer-readable instructions 221; the computer-readable instructions 221, when executed by a processor, implement the steps of the data processing method according to any one of the embodiments described above.

The computer-readable storage medium may include various media that might store the program code, such as U-disk, removable hard disk, ROM, random access memory (RAM), and magnetic or optical disks.

Various embodiments are described in the specification in a progressive manner, with each embodiment focusing on differences from the other embodiments, and with reference to the same or similar parts of the various embodiments. The apparatus disclosed in the embodiments is relatively simple to describe since it corresponds to the method disclosed in the embodiments, as explained in the method section.

The skilled in the art may further be aware that the units and algorithmic steps of each example described in conjunction with the embodiments disclosed herein might be implemented in electronic hardware, computer software, or a combination of the two, and that the composition and steps of each example have been described generally by function in the above notes to clearly illustrate the interchangeability of hardware and software. Whether such functions are implemented as hardware or software depends upon the specific application and design constraints imposed on the technical solutions. The skilled in the art may implement the described functions in varying ways for each specific application, but such implementation should not be interpreted as causing a departure from the scope of the present application.

The steps of the methods or algorithms described in combination with the embodiments disclosed herein may be implemented directly with hardware and a software module executed by the processor, or a combination of the two. The software module may be arranged in a RAM, a memory, an ROM, a PROM, an EEPROM, a register, a hard disk, a removable magnetic disk, a compact disc read-only memory (CD-ROM), or any other form of storage medium known in the art.

Finally, it should be noted that in this context, relations such as first and second are used solely to distinguish one entity or operation from another and do not necessarily require or imply any such actual relationship or order between these entities or operations. Moreover, the terms "include/include", "contain", or any other variation thereof, are intended to cover a non-exclusive inclusion, such that a process, method, article, or device that includes a list of elements does not include only those elements but may include other elements not expressly listed or inherent to such process, method, article, or device.

In the specification, specific examples are applied to illustrate the principle and implementation of the present application. The above embodiments are only used to help understand the method of the present application and its core ideas. At the same time, for the ordinarily skilled in the art, according to the idea of the present application, there will be changes in the implementation and scope of application, in summary, the content of the specification should not be understood as a limitation of the present application.

What is claimed is:

1. A data processing method, being applied to a convolution adaptor, the convolution adaptor being arranged between an external storage and an internal cache of a computing unit, and the data processing method comprising:
    acquiring register data, wherein the register data is determined according to data types of target data and/or convolution types of convolution processing applied to the target data, and is used for describing reading modes of the target data, wherein the register data comprises jump stride data and jump cycle control data; and
    reading the target data from the external storage according to the register data, and storing the target data in the internal cache according to a data read sequence;
    wherein the reading the target data from the external storage comprises:
    determining a target address according to a number of cycles;
    executing, according to the target address and the jump stride data, a jump read operation in the external storage;
    updating the number of cycles in response to a number of jumps of the jump read operation matching the jump cycle control data; and
    determining, in response to the number of cycles matching the jump cycle control data, that reading of the target data is completed.

2. The data processing method according to claim 1, wherein a plurality of sets of register data is provided, each set of register data comprises next register pointer data, a data type of the data types refers to address discrete data, and a generation process of the register data comprises:
    determining a plurality of non-contiguous address intervals corresponding to the target data;
    generating a plurality of different sets of the register data according to different address intervals of the plurality of non-contiguous address intervals; and
    setting the next register pointer data in the register data according to a sequential relationship of the plurality of non-contiguous address intervals, such that the next register pointer data in a previous set of the register data points to an address of a next set of the register data.

3. The data processing method according to claim 1, wherein a data type of the data types refers to a splitting type, and a generation process of the register data comprises:
    determining a splitting direction of the target data according to the splitting type of the target data;
    determining the jump stride data and the jump cycle control data according to the splitting direction; and
    generating the register data using the jump stride data and the jump cycle control data.

4. The data processing method according to claim 1, wherein a convolution type of the convolution types refers to a splitting convolution type, and a generation process of the register data comprises:
    determining a splitting direction of the target data according to the splitting convolution type of the target data;
    determining the jump stride data and the jump cycle control data according to the splitting direction; and
    generating the register data using the jump stride data and the jump cycle control data.

5. The data processing method according to claim 1, wherein a data type of the data types refers to two-dimensional (2D) data, and a generation process of the register data comprises:
    setting, in response to the target data being 2D multiplier data, the jump stride data and the jump cycle control data to default values; and
    setting, in response to the target data being 2D multiplicand data, the jump stride data according to a number of row vector elements of the target data, and setting the jump cycle control data according to a number of column vector elements of the target data.

6. The data processing method according to claim 1, wherein a convolution type of the convolution types refers to a deconvolution type, and a generation process of the register data comprises:
    determining a horizontal jump stride and a vertical jump stride;
    determining, according to a convolution kernel, a convolution matrix using the horizontal jump stride and the vertical jump stride; and
    generating the register data according to coordinate positions of each element in the convolution matrix in the convolution kernel.

7. The data processing method according to claim 1, wherein a convolution type of the convolution types refers to a dilated convolution type, and a generation process of the register data comprises:

determining a dilated multiple;
determining the jump stride data and the jump cycle control data according to the dilated multiple; and
generating the register data using the jump stride data and the jump cycle control data.

8. The data processing method according to claim 1, wherein a convolution type of the convolution types refers to a deformable convolution, and a generation process of the register data comprises:
determining a reference coordinate and an offset distance of a target image date of the target data; and
generating the register data using the reference coordinate and the offset distance.

9. The data processing method according to claim 1, characterized in wherein the convolution adaptor comprises a local cache, the register data comprises cache flag data corresponding to each sub-data in the target data, and the method further comprises:
saving the sub-data to the local cache in response to the cache flag data not being in a non-cache status.

10. The data processing method according to claim 9, further comprising:
storing the sub-data in the internal cache in response to the cache flag data being in an output status.

11. An electronic device, comprising:
a memory storing therein computer readable instructions; and
one or more processors configured to execute the computer readable instructions, wherein upon execution of the computer readable instructions, the one or more processors is configured to:
acquire register data, wherein the register data is determined according to data types of target data and/or convolution types of convolution processing applied to the target data, and is used to describe reading modes of the target data, wherein the register data comprises jump stride data and jump cycle control data; and
read the target data from an external storage according to the register data, and store the target data in an internal cache according to a data read sequence;
wherein in order to read the target data from the external storage, the one or more processors, upon execution of the computer readable instructions, is configured to:
determine a target address according to a number of cycles;
execute, according to the target address and the jump stride data, a jump read operation in the external storage;
update the number of cycles in response to a number of jumps of the jump read operation matching the jump cycle control data; and
determine, in response to the number of cycles matching the jump cycle control data, that reading of the target data is completed.

12. The electronic device according to claim 11, further comprising a plurality of register sets, each register set of the plurality of register sets comprising a plurality of registers, and each register set of the plurality of register sets being configured to record a set of register data.

13. The electronic device according to claim 12, further comprising a read and write controller, the read and write controller being configured to control reading and writing of the register data of the register sets or to read and write the target data.

14. The electronic device according to claim 12, wherein a number of the register sets is two, and the two sets of the register sets are mutually ping-pong register sets.

15. The electronic device according to claim 11, further comprising a local cache configured to store the target data or sub-data constituting the target data.

16. The electronic device according to claim 11, further comprising an offset distance acquisition component configured to acquire an offset distance under a condition that the convolution type is deformable convolution.

17. The electronic device according to claim 11, further comprising a triggering component configured to trigger activation of the electronic device.

18. One or more non-transitory computer-readable storage media storing therein computer-readable instructions, wherein the computer-readable instructions, upon execution by one or more processors, are configured to cause the one or more processors to:
acquire register data, wherein the register data is determined according to data types of target data and/or convolution types of convolution processing applied to the target data, and is used to describe reading modes of the target data, wherein the register data comprises jump stride data and jump cycle control data; and
read the target data from an external storage according to the register data, and store the target data in an internal cache according to a data read sequence;
wherein in order to cause the one or more processors to read the target data from the external storage, the computer-readable instructions are configured to cause the one or more processors to:
determine a target address according to a number of cycles;
execute, according to the target address and the jump stride data, a jump read operation in the external storage;
update the number of cycles in response to a number of jumps of the jump read operation matching the jump cycle control data; and
determine, in response to the number of cycles matching the jump cycle control data, that reading of the target data is completed.

19. The electronic device according to claim 12, wherein in a progress of first register data in a first register set being applied to data transfer, a second register set is configured to be loaded with second register data.

20. The electronic device according to claim 11, wherein upon execution of a generation process of the register data by the one or more processors, the one or more processors is further configured to:
determine a plurality of non-contiguous address intervals corresponding to the target data;
generate a plurality of different sets of the register data according to different address intervals of the plurality of non-contiguous address intervals; and
set a next register pointer data in the register data according to a sequential relationship of the plurality of non-contiguous address intervals, such that the next register pointer data in a previous set of the register data points to an address of a next set of the register data.

* * * * *